US011449542B2

United States Patent
Levy et al.

(10) Patent No.: US 11,449,542 B2
(45) Date of Patent: Sep. 20, 2022

(54) SYSTEMS AND METHODS FOR IDENTIFYING UNWANTED PHOTOS STORED ON A DEVICE

(71) Applicant: Avast Software s.r.o., Prague (CZ)

(72) Inventors: Ron Levy, Tel-Aviv (IL); Aviad Ashkenazi, Givatayim (IL)

(73) Assignee: Avast Software s.r.o.

( * ) Notice: Subject to any disclaimer, the term of this patent is extended or adjusted under 35 U.S.C. 154(b) by 110 days.

(21) Appl. No.: 15/042,070

(22) Filed: Feb. 11, 2016

(65) Prior Publication Data
US 2016/0239519 A1   Aug. 18, 2016

Related U.S. Application Data

(60) Provisional application No. 62/114,647, filed on Feb. 11, 2015.

(51) Int. Cl.
*G06F 16/30* (2019.01)
*G06F 16/583* (2019.01)
*G06T 7/00* (2017.01)
*G06T 5/00* (2006.01)

(52) U.S. Cl.
CPC .......... *G06F 16/5838* (2019.01); *G06T 5/003* (2013.01); *G06T 7/0002* (2013.01); *G06T 2207/30168* (2013.01)

(58) Field of Classification Search
CPC ............................... G06F 16/48; G06F 16/951
USPC ........ 707/609, 687, 705, 769, 790, 813, 821
See application file for complete search history.

(56) References Cited

U.S. PATENT DOCUMENTS

| | | | |
|---|---|---|---|
| 10,395,297 B1* | 8/2019 | Ivie | G06Q 30/0631 |
| 2005/0102635 A1 | 5/2005 | Jiang et al. | |
| 2008/0071929 A1* | 3/2008 | Motte | H04L 67/53 |
| | | | 709/217 |
| 2008/0232765 A1 | 9/2008 | Patten et al. | |
| 2009/0292732 A1 | 11/2009 | Manolescu | |
| 2011/0153423 A1* | 6/2011 | Elvekrog | G06Q 30/02 |
| | | | 705/14.53 |

(Continued)

OTHER PUBLICATIONS

International Search Report, Application No. PCT/US2016/017625, dated Apr. 21, 2016.

*Primary Examiner* — Sana A Al-Hashemi
(74) *Attorney, Agent, or Firm* — Kramer Levin Naftalis & Frankel LLP

(57) ABSTRACT

Systems and methods are presented for identifying unwanted photos and videos on a device. Such systems may contain various modules to do one or more of: (i) review the image quality of photos and videos, (ii) review a user's interaction with photos and videos, (iii) review the properties of photos and videos, (iv) review the user's profile/preferences as to photos, or (v) review information obtained from additional sources regarding the user, his or her photos, and any interaction therewith. With one tap, an exemplary application can identify all of a user's unwanted photos, such as, for example: photos with bad lighting, blurry shots, similar photos, and even photos that the system predicts a user may find boring. Any photos that an exemplary system is unsure about may be left for the user to review and act upon. By analyzing user decisions exemplary systems become progressively more accurate and thus improve their predictions over time.

26 Claims, 14 Drawing Sheets
(14 of 14 Drawing Sheet(s) Filed in Color)

(56) References Cited

U.S. PATENT DOCUMENTS

| | | | |
|---|---|---|---|
| 2011/0249073 A1* | 10/2011 | Cranfill | H04M 1/72469 |
| | | | 348/14.02 |
| 2012/0188405 A1 | 7/2012 | Morrison et al. | |
| 2013/0101220 A1* | 4/2013 | Bosworth | G06K 9/6201 |
| | | | 382/195 |
| 2013/0104080 A1* | 4/2013 | Bosworth | G06V 20/40 |
| | | | 715/838 |
| 2013/0117365 A1* | 5/2013 | Padmanabhan | H04L 67/10 |
| | | | 709/204 |
| 2013/0129142 A1 | 5/2013 | Miranda-Steiner et al. | |
| 2013/0268357 A1* | 10/2013 | Heath | G06Q 30/02 |
| | | | 705/14.53 |
| 2014/0258297 A1 | 9/2014 | Davari | |
| 2014/0358919 A1 | 12/2014 | Chandra | |
| 2014/0363079 A1 | 12/2014 | Sutherland et al. | |
| 2014/0369627 A1* | 12/2014 | Huang | G06V 40/176 |
| | | | 382/309 |
| 2015/0243325 A1* | 8/2015 | Pacurariu | G11B 27/28 |
| | | | 386/280 |

\* cited by examiner

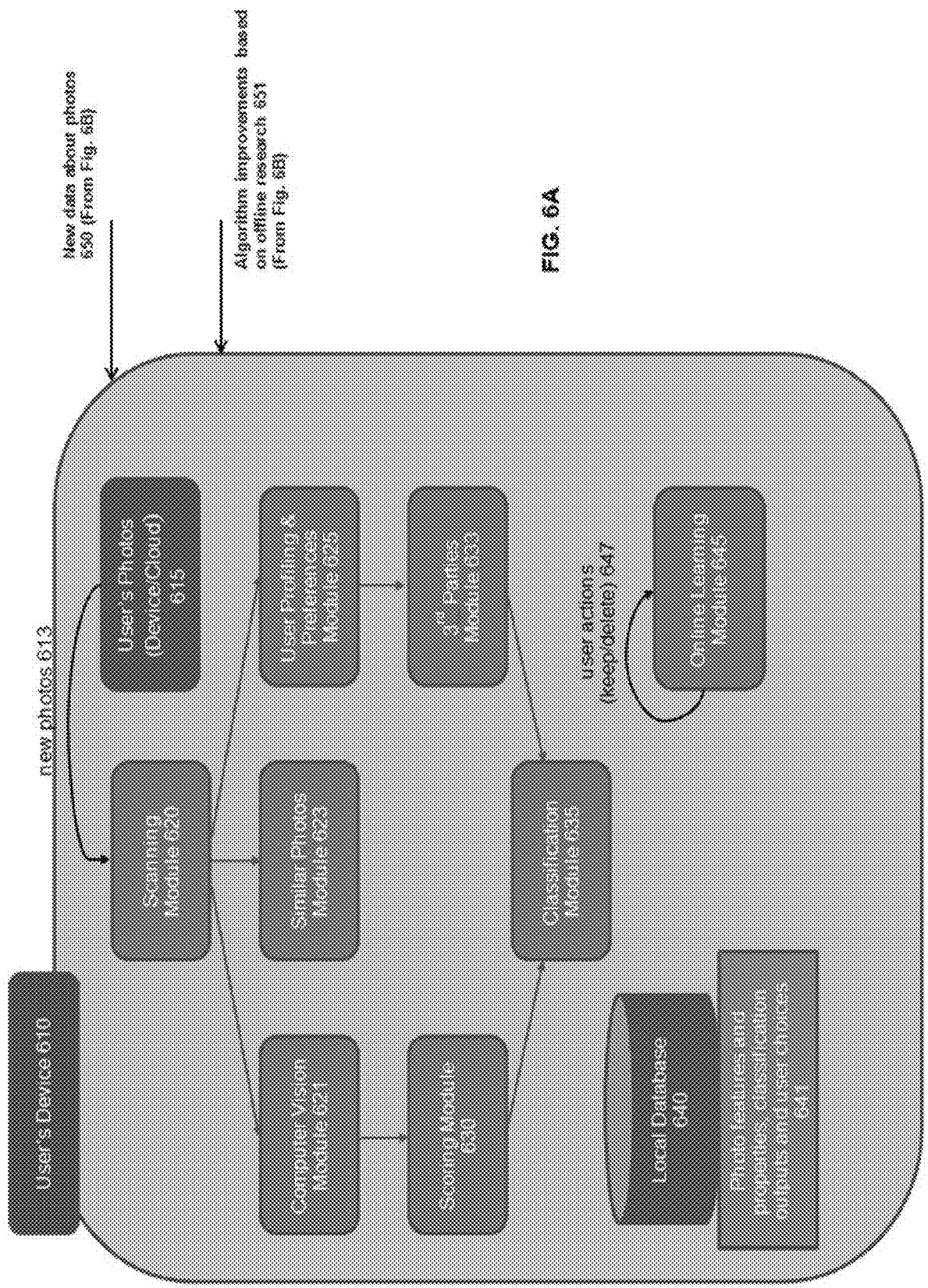

SYSTEMS AND METHODS FOR IDENTIFYING UNWANTED PHOTOS STORED ON A DEVICE

CROSS REFERENCE TO RELATED APPLICATIONS

The present invention claims the benefit of U.S. Provisional Patent Application No. 62/114,647, entitled "SYSTEMS AND METHODS FOR IDENTIFYING UNWANTED PHOTOS STORED ON DEVICE", and filed on Feb. 11, 2015, the entire disclosure of which is incorporated herein by this reference.

TECHNICAL FIELD

The present invention relates to managing photos and videos in general, and in particular to reviewing photos and videos on a user device and automatically identifying unwanted photos and/or videos that can be removed.

BACKGROUND OF THE INVENTION

Modern mobile devices such as, for example, smartphones and tablets are equipped with powerful cameras. As a result, it is both easy and common for users to take pictures and videos using such mobile devices, so many users often find themselves with a large quantity of photos and videos on their mobile device, computer, digital camera, or the like. This plethora of images can occupy substantial storage space on these devices. Frequently, some of the photos are not photos a user really wants to keep, such as, for example, duplicate photos, photos with bad quality, or "boring" and uninteresting photos. While it is rather easy to take many photos and videos, it can be a time consuming (and itself rather boring) task to regularly review all of one's existing photos and videos on a given device and compare them to each other in order to decide which to keep and which to delete.

What is thus needed in the art is an intelligent and automated solution that can help users to analyze their collections of images and remove unwanted photos and videos from their various devices.

SUMMARY OF INVENTION

It is an object of the present invention to provide a system to identify unwanted photos and videos on a device, based on, for example, at least one of: (i) reviewing the image quality of photos and videos, (ii) reviewing the user interaction with photos and videos, (iii) reviewing the properties of photos and videos, (iv) reviewing the user profile/preferences of the owner of the photos or someone depicted in the photos, or (v) reviewing information obtained from additional sources, such as, for example, social networks, user contacts, or a user calendar.

Exemplary embodiments of the present invention provide a fast way for a user to automatically identify unwanted photos that are taking up valuable storage on his or her device. Thus, with one tap, an exemplary application can identify all of a user's unwanted photos, such as, for example: photos with bad lighting, blurry shots, duplicates, similar photos, and even photos that the system predicts a user may find boring or uninteresting. Any photos that an exemplary system is unsure about may be left for the user to review and act upon with minimal effort, in a review functionality. For example, swipe right to keep, left to trash.

In exemplary embodiments of the present invention, a system gets more accurate by analyzing the user's decisions; it learns which photos the user does not like and thus improves its predictions over time.

In one embodiment, the present invention includes a system for identifying unwanted photos comprising at least one processor and a memory, the memory containing instructions that cause the processor to:
(i) scan a device to identify a plurality of photos;
(ii) determine the quality of each photo and assign each photo with an image quality score; and
(iii) propose photos for removal based on their image quality score.

These functions may be conceived of as modules within a software program or application provided on a device, such as, for example, a smartphone, tablet, computer, or the like.

In some embodiments, the image quality of a photo (a term which includes videos and other images, such as screenshots) may be evaluated by image sharpness, lighting, diversity of colors in the photo, whether the photo contains faces, and if so, how big the faces are, or whether the photo contains landscape, text, specific objects, or any combination of these criteria.

In some embodiments, the system may further (i) determine the extent of interaction of the user with each photo and (ii) assign each photo with an interaction score, and in such embodiments proposing photos for removal may be based, in part, on the interaction score.

In some embodiments, such extent of the user's interaction with each photo may be determined by: the number of times the user has viewed each photo, the extent of time the user has watched each photo, the number of times the user has sent or posted the photo, whether a user has deleted the photo or selected the photo as a favorite, or any combination of these criteria.

In some embodiments, an exemplary system may further (i) determine the properties of each photo, and (ii) assign each photo with an image properties score, and in such embodiments proposing photos for removal, may be based, at least in part, on the image properties score.

In some embodiments, the image properties of a photo may comprise: the time the photo was taken, the location the photo was taken at, the folder in which the photo is stored, identities of persons in the photo, length of a video, time of day the photo was taken at, was the photo taken at a place of interest, was the photo taken using the device's camera, is the photo a screenshot, how many photos were taken during a window of time close to the photo's date, was the photo taken at a special event, was the photo taken at a specific location, or any combination of these criteria.

In some embodiments, an exemplary system may further assign to each photo a user profile score, and in these embodiments proposing photos for removal may also be based, at least in part, on the user profile score.

In some embodiments, the user profile score may include, or take into account, information concerning where the user lives or works, statistics regarding photographic habits of the user, user preferences regarding style of photos, number of photos the user usually takes on the weekend, number of photos usually taken when on a trip or outing, whether the user likes or dislikes screenshots, whether the user prefers landscape photos or portrait photos, was the photo taken at a favorite location of the user, was the photo taken with favorite people of the user, whether the user is attending a meaningful event based on an analysis of his or her photography habits, whether the user prefers photos with large or small faces, whether the photo includes people that the user likes or frequently communicates with, whether the photo contains people who are friends or family of the user, whether the user prefers night shots or not, what the user's favorite places, or places he or she dislikes, are, whether the user prefers photos taken at work or not, or any combination of these criteria.

In some embodiments, an exemplary system may assign each photo with a 3rd party score, and where the recommendation module proposes photos for removal based, at least in part, on the 3rd party score.

In some embodiments, the 3rd party score may comprise information extracted from social media applications or networks (e.g., networks shared, number of likes received, number of comments received, etc.), user calendar, contact lists (e.g., from phone, messaging, chat or other applications), or from any other application, or any combination of these sources.

In some embodiments, user selections of whether to keep or delete a photo may be analyzed and used by the system or application to accurately predict a user's preference whether to keep or delete a photo.

BRIEF DESCRIPTION OF THE DRAWINGS

The U.S. application file contains at least one drawing executed in color. Copies of the U.S. patent application publication with color drawings(s) will be provided by the U.S. Patent Office upon request and payment of the necessary fee.

FIGS. 6A and 6B are magnified versions of the left and right sides of FIG. 6, respectively, for easier reference and description.

DETAILED DESCRIPTION

Figure 1:
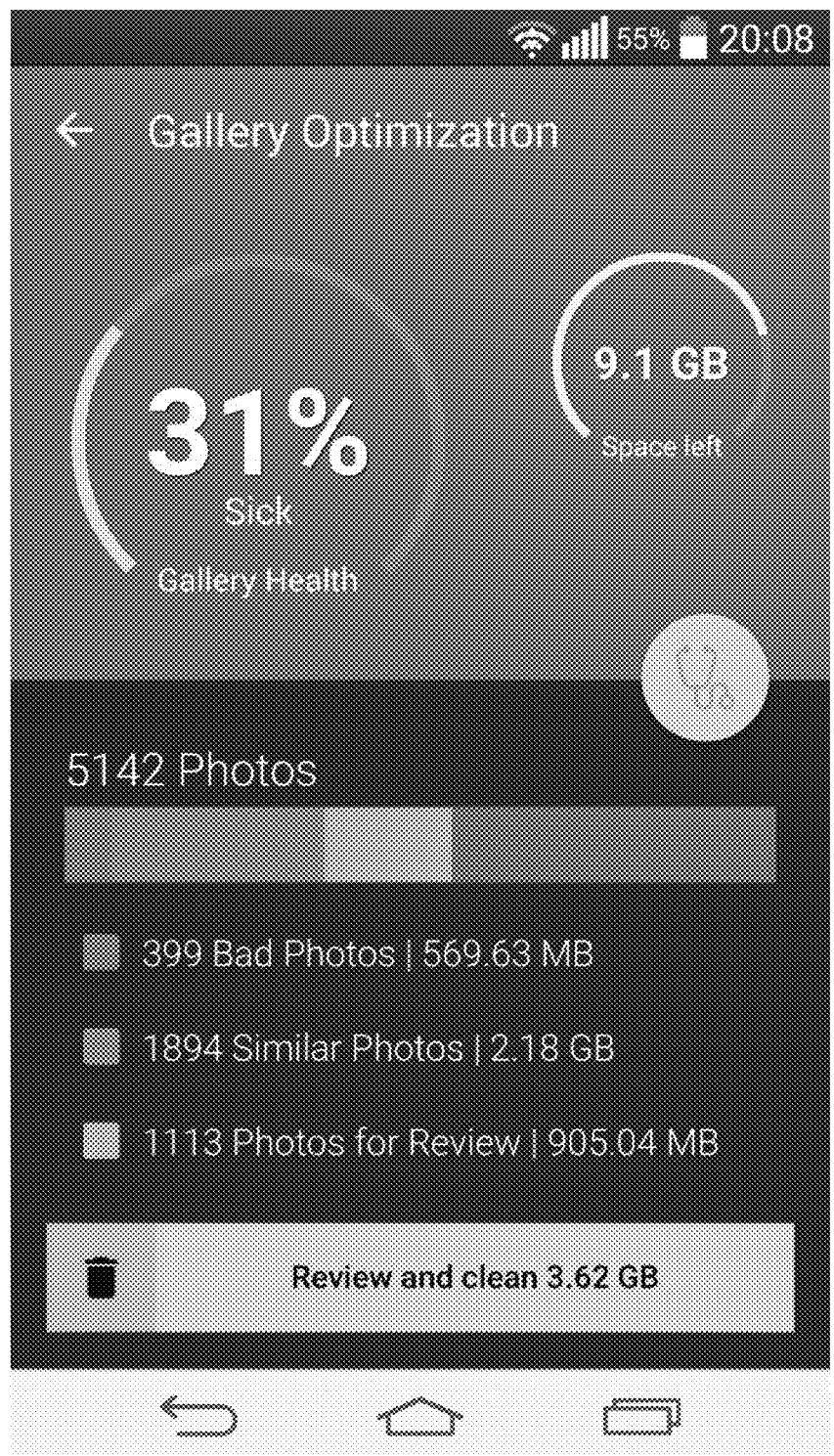
FIG. 1 depicts an exemplary screenshot of a summary screen on a smartphone application displaying overall "Gallery Health" and potential unwanted photos categorized into three categories: "Bad Photos", "Similar Photos" and "Photos For Review", according to an exemplary embodiment of the present invention.

In the following detailed description, reference is made to the accompanying drawings that form a part thereof, and in which are shown by way of illustration specific embodiments in which the invention may be practiced. It is understood that various other embodiments may be utilized or implemented, and structural changes may be made without departing from the scope of the present invention.

It will be readily apparent that the various methods and algorithms described herein may be implemented by, for example, appropriately programmed general purpose computers and computing devices, including smartphones, tablets, PCs and the like. Typically, a processor (e.g., one or more microprocessors) on such a device will receive instructions from a memory or similar device or component, and execute those instructions, thereby performing one or more processes defined by those instructions. Further, programs that implement such methods and algorithms may be stored and transmitted using a variety of media in a number of manners. In some embodiments, hard-wired circuitry or custom hardware or chipsets may be used in place of, or in combination with, software instructions for implementation of the processes of various embodiments. Thus, embodiments according to the present invention are not limited to any specific combination of hardware and software.

As used herein, a "processor" means any one or more microprocessors, central processing units (CPUs), computing devices, microcontrollers, digital signal processors, or like devices.

Exemplary embodiments of the present invention relate to managing photos, which, as used herein, is understood to include both still photos, video files and images, such as captured screenshots and other image files.

The present invention thus relates to a system comprising a processor and memory for identifying unwanted photos. The system may include various modules, such as (i) a scanning module for identifying a plurality of photos on one or more user devices. The user device can be any computing platform such as a smartphone, a tablet, a desktop PC, a set-top box, a laptop or cloud storage. The invention can also help manage photos taken with a digital camera, after the photos were transferred to a computer.

The system may also include (ii) an image quality module for determining the quality of each photo and assigning each photo with an image quality score. Additionally, an exemplary system may include (iii) a classification or recommendation module for proposing photos to a user for removal based on an assigned image quality score.

As noted, such modules may be implemented in software, and thus a module may be a functional aspect of an overall set of instructions. Thus, as used herein, the term "system" may refer to either physical circuits and chipsets, or a software application, or any combination of the two.

In exemplary embodiments of the present invention, photos may be analyzed based on different parameters. During this process the system may gather and set different features for each photo (examples of photo features include blurriness score, or whether the photo was taken at work).

In some embodiments, based on these features, photos may, for example, be classified into two groups:

Bad photos: photos that are decided to be of bad quality or boring, and the system suggests that the user delete them; and Photos for review: photos for which the system predicts the user may want to delete but the estimated prediction accuracy is not sufficient, so user intervention and decision are requested.

In exemplary embodiments of the present invention, such a classification may be performed via two main methods:

1. Based on features data of each photo, the system runs a set of rules that determine if a photo is (1) bad or (2) for review or (3) neither; or
2. Using machine learning algorithms the system reviews the different features of the photo and uses historic data analysis on user selections to predict whether or not to propose the photo for deletion. The more results that are available on actual user selections to classify photos, the more an exemplary system can learn about the general behavior/preferences of many users and thus better predict the preferences of a specific user. For example, most users prefer pictures with people in them and tend to keep fewer pictures of only scenery or landscapes. In addition, an exemplary system can learn from a specific user's past selections (keep/delete photos) and apply that knowledge to predict future selections for that user.

In exemplary embodiments of the present invention, data or features for a given photo can be gathered or analyzed in various ways, such as one or more of the following:

1. Computer Vision

A set of algorithms can be run that analyze the quality of the photo and what it contains. The system either gives a score to the photo in different quality-related parameters, or analyzes whether a photo is of a certain type or contains some object. Examples of such quality parameters include:
  Blurriness;
  Darkness;
  Diversity of colors in the photo;
  Does the photo contain faces;
  How large are the faces in the photo;
  Does the photo contain a landscape; and
  Does the photo contain text.

2. Photo Metadata

An exemplary system can analyze metadata associated with the photo and use that as features of, or for, the photo. For example:
  Time of day the photo was taken;
  Location at which the photo was taken;
  Was the photo taken at a place of interest ("Par)?
  Folder that the photo is in on a user device;
  Was the photo taken using the device's camera?
  Is the photo a screenshot?
  How many photos were taken within a window of time close to the photo's date and time?

3. User Profiling & User Preferences

In exemplary embodiments of the present invention, algorithms may be used that analyze the user data on hand (for example, a user's photographic history) to both profile the user and understand his or her preferences. Such data can include, for example:
  User's home location;
  User's work location;
  Number of photos the user usually takes during the weekend;
  Number of photos the user usually take when on a trip;
  User's like or dislike of screenshots;
  User's preference for landscape photos or portrait photos;

Based on the above, different photo features can be analyzed, such as, for example:
  Was the photo taken at work?
  Was the photo taken during a trip?
  Was the photo taken at a POI?
  Was the photo taken during a meaningful event for the user?

4. User Interactions

In exemplary embodiments of the present invention, each action a user takes with a photo may be tracked, and can be used as part of the classification process. Examples of possible user actions can include:
  Viewing a specific photo;
  Sharing a specific photo;
  Deleting a specific photo; and
  Amount of time spent viewing a specific photo.

5. $3^{rd}$ Party Data

In exemplary embodiments of the present invention, a system can connect to different social platforms, external tools or applications the user may be using, or may have used, and extract information from them that can be related directly or indirectly to the users' photos. For example, an exemplary system may determine:
  Was the photo shared on a social platform? (e.g., Facebook, Whatsapp, Snapchat)
  How many likes did the shared photo get?
  Does the user have an event in his calendar at the time the photo was taken?

As noted above, an important feature of exemplary systems according to the present invention is the ability to learn from a user's past actions and decisions to make better predictions in the future. As users take actions and make decisions, an exemplary system can learn from decisions made by users regarding various bad photos they are shown by identifying whether the user decided to keep the photo or to delete it. This learning applies both in general—i.e., analyzing the preferences of many users and deducing user preferences in general—as well as specifically—i.e., analyzing the preferences of a particular user, or group/demographic of users, and deducing that user's (or group/demographic of users') specific preferences. In other words—users are labeling the data for the system (keep vs. delete) and the system can use those actual user choices to learn whether its predictions were correct or not.

The system may then take all the labeled datasets and use machine learning algorithms, or other heuristics, to improve the outputs of the classification. This can be done in a variety ways, including:
  Using global labeled data of many users to improve the overall classification for all users;
  Running machine learning algorithms for the labeled data for a specific photo, thus personalizing the classification results to an individual user; and
  For each user, changing basic rules (e.g., adapt thresholds) based on the user's actions. The difference here is that changes can be made based on optimizations not directly received from the output of machine learning algorithms.

Given the processing and analyses of photos and photo data as described above, in exemplary embodiments of the present invention, photos may be classified as "Bad" or For Review", as noted above, and also, if applicable, as "Duplicate" or "Similar." These categories are next described in greater detail.

Figure 4:
FIG. 4 depicts an exemplary screenshot where multiple "bad photos" are shown to the user in response to tapping the red "Bad Photos" box in FIG. 1 according to an exemplary embodiment of the present invention.

Bad Photos—"Bad Photo" is the general term used herein to refer to photos that an exemplary system predicts the user would like to remove. Bad photos are photos that the system thinks are too bad to keep, and thus recommends that the user delete them. The user can clean them all with a single tap, as shown in FIG. 4 (by pressing the "trash can" icon at the left of the yellow banner that reads "Delete 399 (marked photos/569.63 MB"), or may, for example, manually choose which ones to keep instead, by only deleting selected photos.

When users click a "Review and Clean" tab they can view a summary page of the bad photos, such as is shown in FIG.

4. This summary page can show, for example, thumbnails of all the bad photos ready to be cleaned, all marked to delete. A user can then tap the thumbnail to see the photo in large view, and, when in full-screen, there can be a large X on the photos for quick deletion by a user selecting the X. Additionally, as shown in FIG. 4, there can be a summary explanation message, such as a "clean 30 photos/100 GB" banner on top of, or under, the thumbnails screen. In some embodiments, after clicking the banner, or a trash can or other delete icon in it, the user can be presented with a confirmation alert, such as Are you sure you want to delete XX photos?"

In exemplary embodiments of the present invention, a system may also provide a user with an alternative to deletion: move all the bad photos to a different folder instead of deleting them, or, for example, even create a ZIP, or other archive file, for them.

Optionally, a scale can be shown next to a photo allowing the user to leave feedback, such as, for example, a scale running from "boring" to "very interesting." Such information helps the system learn the user's preferences, and, as noted, this knowledge helps the system better analyze photos in the future and improve the accuracy of its predictions about user preferences as to keep or remove a photo.

Figure 5:
FIG. 5 depicts an exemplary screenshot where photos for review are presented to a user so that he or she may keep or discard them using the "thumbs up" or thumbs down" icons, as shown, according to an exemplary embodiment of the present invention.

Photos for Review—Photos for review are photos that the system estimates are bad but for which the accuracy of that estimate is below a predetermined value. Thus, the system presents these photos to a user one by one so that the user can decide whether to keep or delete them. An example photo review screen is shown in FIG. 5.

Figure 3:
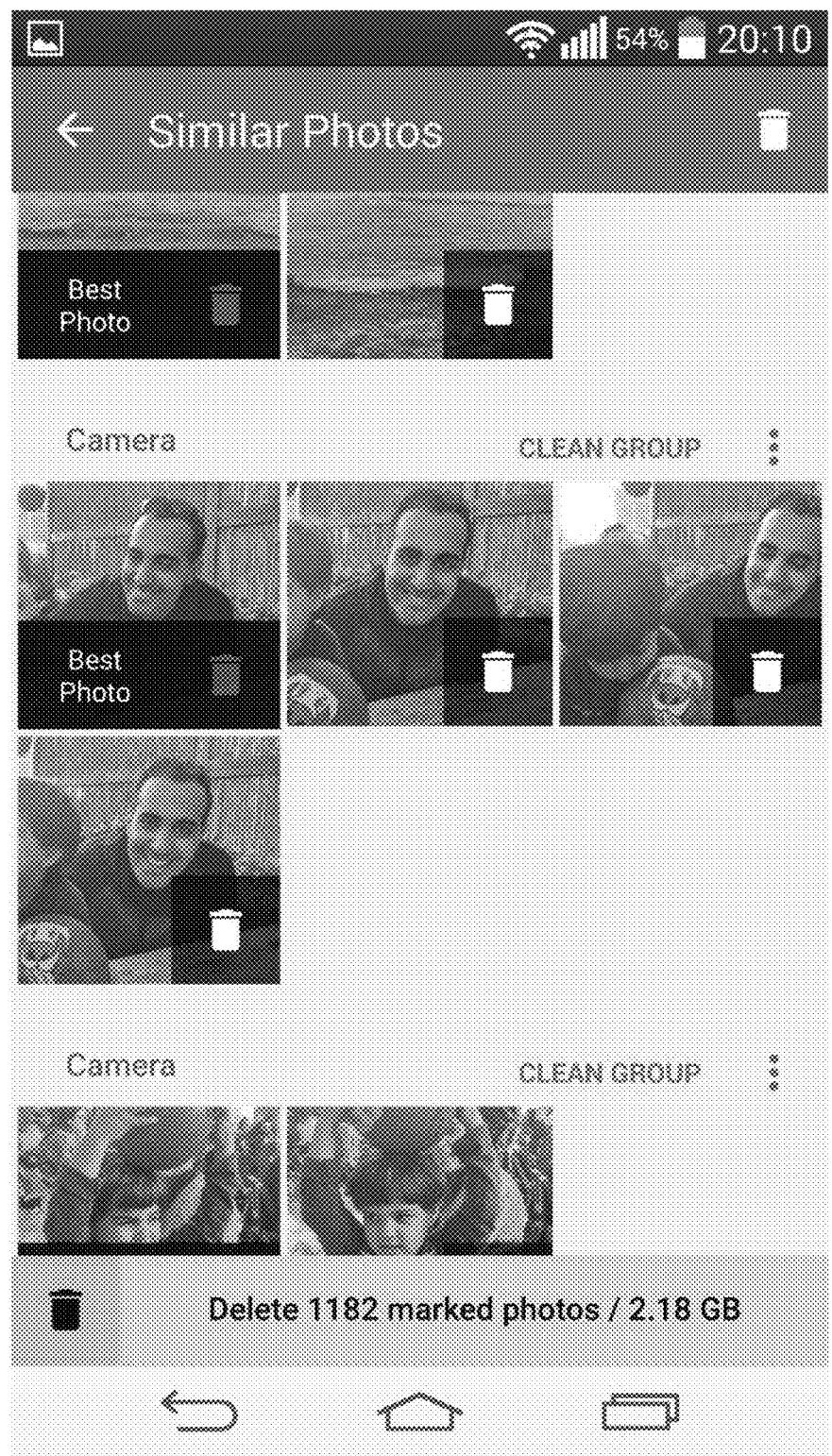
FIG. 3 depicts an exemplary screenshot where multiple sets of "similar photos" are shown to the user in response to tapping the green "Similar Photos" box in FIG. 1 according to an exemplary embodiment of the present invention.

Duplicates or Similar—the system may identify duplicate or similar photos based on the following criteria:
  Same exact photo found in different folders (name, time and date, etc.);
  Set of consecutive photos found that have similar color histograms or similar features (as determined by feature detection algorithms);
  For each set of duplicates or similar photos, an exemplary system can, for example, decide which is the best photo out of the set, and can then mark that photo as "best photo" in a display screen to a user. In general, a best photo will be identified as the one with the highest ranking available. More importantly, if a system can recognize smiles it can give those photos a very high score. FIG. 3 illustrates a "Similar Photos" screen, with three sets of similar photos, where one in each set is labeled "best photo".

In exemplary embodiments of the present invention, the following system practices and user actions can be supported in dealing with duplicate photos:
  1. A user may keep more than one of the duplicate photos;
  2. Duplicates are scanned for ALL of the user's folders; and
  3. When a user opens a photo in full screen:
    the system presents which folder the image is in (only in the case of duplicates that appear in different folders), and
    the system allows for a quick action of keep/delete to minimize user effort needed.

Long Videos—In exemplary embodiments of the present invention, long videos may also be detected. Because they are often not worth all the memory they occupy, long videos may thus be identified, and tagged for deletion, in a parallel fashion to "Bad Photos." In exemplary embodiments of the present invention, long videos may be defined as videos that are either larger than a predetermined size value or longer than a predetermined temporal length value. For example, videos that are longer than 4 minutes and/or larger than 30 MB. Naturally, as devices have faster processors and larger storage areas, the above values may be increased, and may be user definable in any case, in various embodiments.

Exemplary Screen Shots

FIGS. 1-5 depict exemplary screenshots from an exemplary application on a smartphone. The example shown here is a prototype application or "app" known as "Gallery Doctor", and thus the collection of photos on the device is known as a "Gallery" in this app. These screenshots are next described.

FIG. 1 depicts an exemplary "Gallery Optimization" screenshot where potential unwanted photos a mobile phone are categorized into three categories: (1) bad, (2) similar photos, and (3) for review. Each category is shown in a different color in the bar so the user can capture quickly the number of potential bad photos and their size. In this example, there are 3.62 GB of photos that are candidates for deletion. The screen also displays overall gallery health (as described below) and remaining free space on the device.

Figure 2:
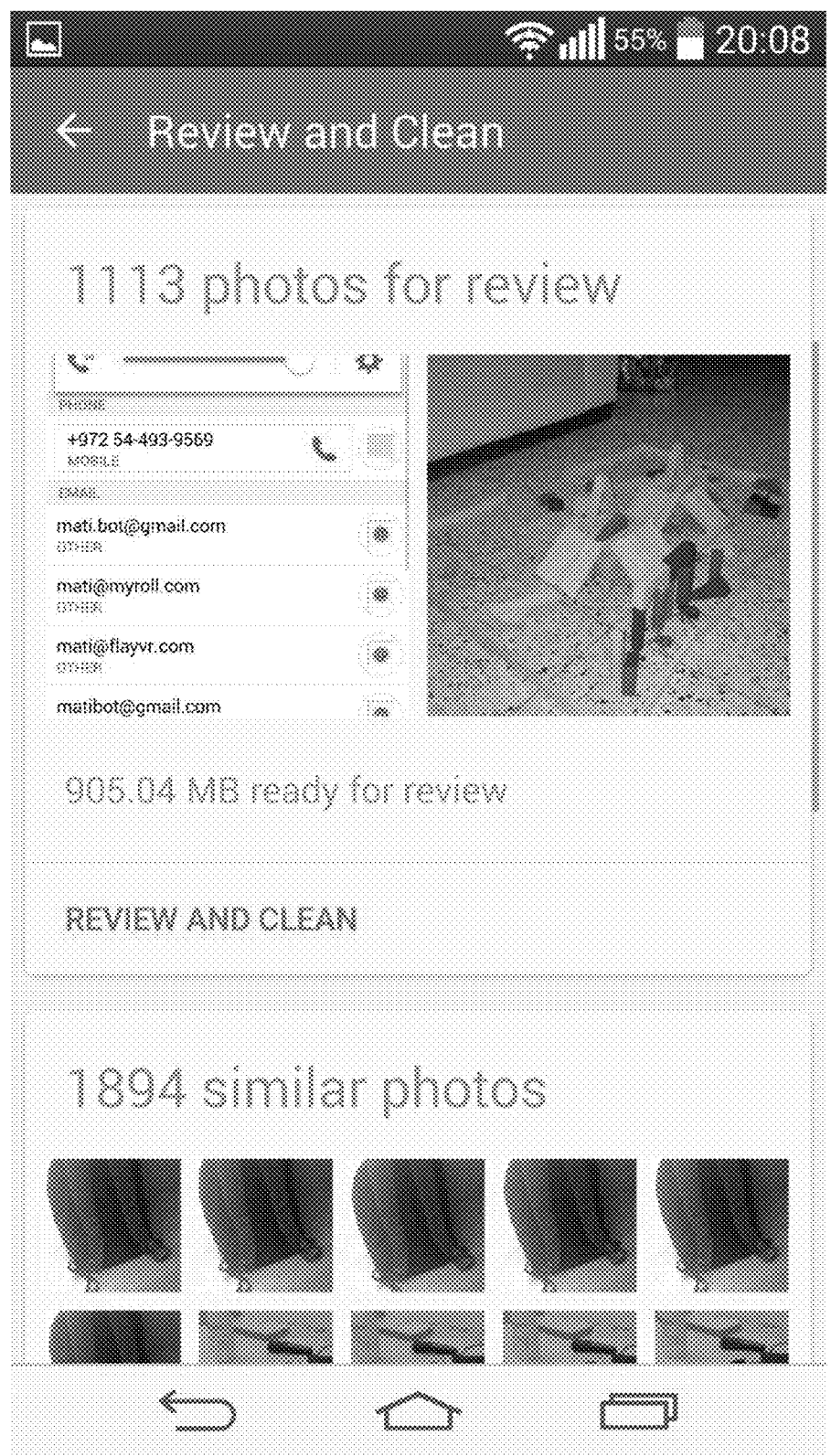
FIG. 2 depicts an exemplary screen shot that a user would see after tapping the "Review and clean" tab in FIG. 1 according to an exemplary embodiment of the present invention.

FIG. 2 depicts an exemplary "Review and Clean" screen shot that a user would see after tapping the "Review and clean" tab in FIG. 1. The total number of deletion candidates is shown, and when the user reviews a photo, its size is displayed along the photo. There is also a "Similar Photos" summary section, as shown.

FIG. 3 depicts an exemplary screenshot where multiple "similar photos" are shown to the user in response to tapping the green "Similar Photos" box in FIG. 1, or the similar photos section of FIG. 2. All similar photos (of the same image) are grouped together and the user can decide which one to keep and which to delete. Optionally, as shown, the system can estimate and point out the best photo to keep.

FIG. 4 depicts an exemplary "Bad Photos" screenshot where multiple "bad photos" are shown to the user in response to tapping the red "Bad Photos" box in FIG. 1, for example. These photos are typically blurry, dark or of bad quality (for example, only half of a subject's face is shown, etc.)—all are candidates for deletion. The bad photos may be deleted all at once, by pressing the trash can icon at the bottom left (in the summary banner), or, for example, one by one using the trash can icon shown in each individual photo, or any combination of group or individual removal methods.

FIG. 5 depicts an exemplary "Review" screenshot where photos for review are presented to the user one by one so that her or she may keep or discard them using the "thumbs up" or thumbs down" icons, as shown at the bottom of the screen.

In some embodiments, an exemplary system may display to the user a dashboard with pertinent information so that a user immediately appreciates how much of a problem bad photos are on his or her device. For example, an overall gallery health score can be calculated and displayed based on the overall degree to which the user's photo collection or "Gallery" is "bad." The following categories, for example, may be used (names are exemplary):
  Super Strong (90-100%)
  Strong (75-90%)
  Average (50-75%)
  Sick (25-50%)
  Very sick (10-25%)
  Danger (0-10%)

FIG. 1 thus presents this information to a user in the "Gallery Health" portion of the screenshot, and in this example, the user's photo gallery is "Sick", due to 31% of the photos being "bad".

In exemplary embodiments of the present invention, an application may be run either specifically at the user's request, or as a background task on a user device, when the user device is idle, as may be set by the user.

Exemplary Process Flow and Exemplary Algorithms and Analyses

Given the discussion of general principles and techniques provided above, next described is an exemplary process flow diagram for exemplary embodiments of the present invention.

Figure 6:
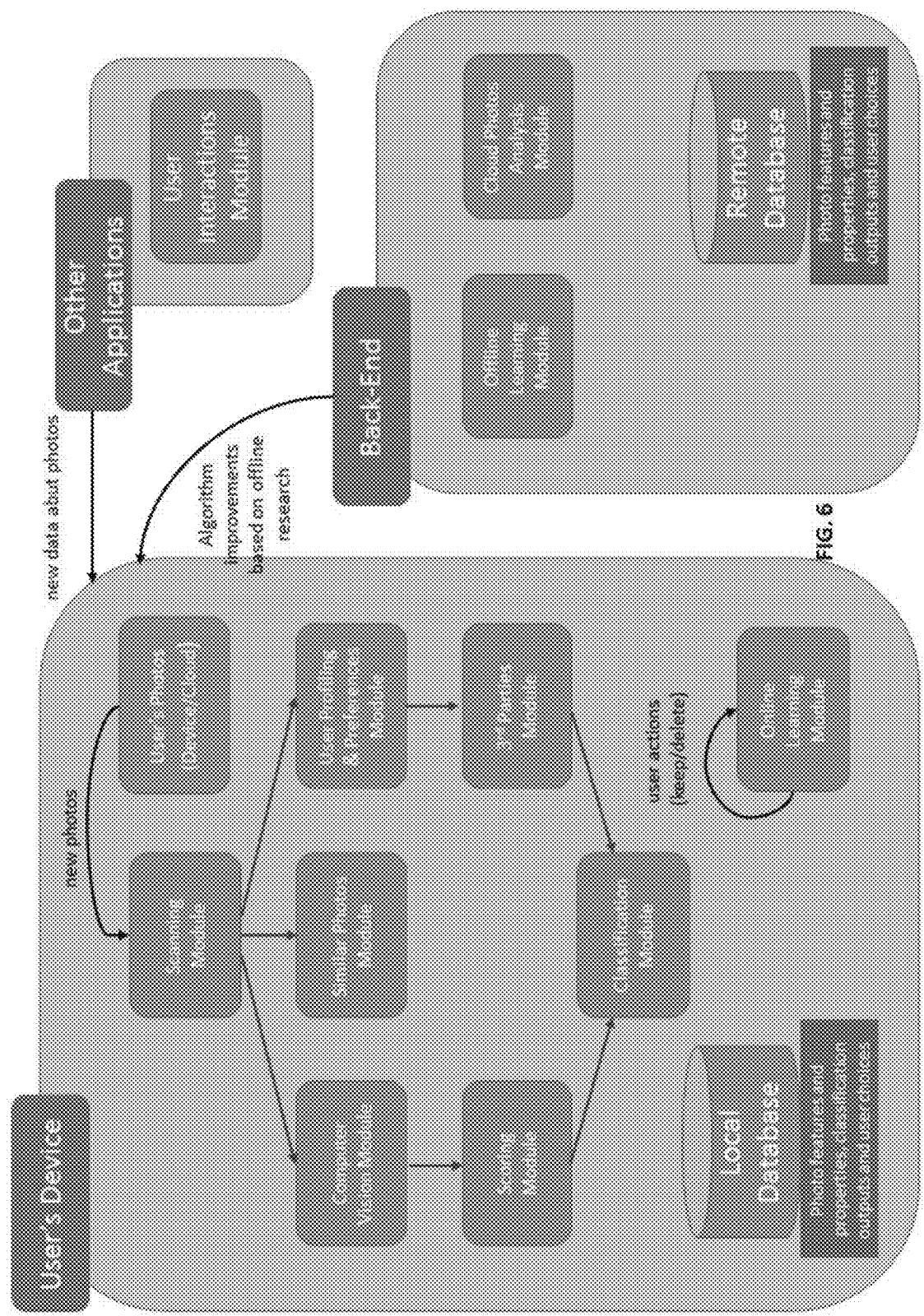
FIG. 6 is an exemplary process flow chart for an exemplary embodiment of the present invention.

FIG. 6 is a process flow diagram according to exemplary embodiments of the present invention. Because the complete process flow diagram is large, its two components, namely processing on the User's Device (left side of FIG. 6) and processing on "Other Applications" and "Back End" (both on the right side of FIG. 6), are separated into two figures, namely FIG. 6A and FIG. 6B, respectively, for ease of description. These are next described.

With reference to FIG. 6A, Scanning Module 620 is tasked with identifying photos on a user's device, i.e., User's Photos 615. These include a user's photos on the device itself, or those stored in the cloud (e.g., on a Dropbox account, Google Drive account, or other cloud storage arrangement) but accessible on the user's device. All photos identified by Scanning Module 620 are analyzed and classified based on the various algorithms described below. Additionally, as shown at 613 any new photo taken or added to the device is automatically detected and analyzed.

Scanning Module 620 is tasked with gathering and storing image properties. In this exemplary embodiments of the present invention, image properties of each photo may comprise the following:

Time and date the photo was taken;
Location where the photo was taken;
Folder the photo is stored in;
Length of a video;
Number of photos taken during a window of time close to the photo's date/time;
Whether the photo was taken at a place of interest ("POI"); and
Whether the photo a screenshot or other computer generated or scanned image.

Once a photo has been scanned, the following modules (and these divisions are logical, and may in various embodiments, be combined or subdivided further) may process the photo and photo-related information, to generate a classification (and therefore recommended action):

A. Computer Vision Module

Computer Vision Module 621 is tasked with analyzing a photo's quality and understanding the content of the photo using various computer vision algorithms. Exemplary computer vision algorithms that may be used can include:

1. Blurriness

A blurriness score may be generated for each photo using edge detection analysis. An exemplary process to calculate the score is as follows:

Convert the original photo to grayscale and generate a grayscale pixel matrix;
Use a Laplacian operator on the grayscale matrix;
Calculate the standard deviation of the generated matrix; and
Score the blurriness based on the stdev value.

2. Darkness

Each photo can receive a darkness score which can, for example, be calculated in the following manner:

Calculate the color histogram of the photo, using 0-255 buckets;
Count the number of pixels in the 0-30 buckets; and
Divide that number by the total number of pixels in the photo.

3. Colorfulness

A colorfulness score gives an estimate to how interesting a photo is. A photo can be clear and bright but still be "boring", such as, for example, a photo of a whiteboard, plain blue sky, or an uninteresting object, such as a computer mouse (See FIG. 8). The colorfulness score thus measures the diversity and frequency of different color values in a photo, when is generally correlated with "interest" and, in exemplary embodiments, may be calculated as follows:

Calculate the color histogram of the photo, using 0-255× 0-255 buckets;
Calculating the diff of the histogram from the most colorful" histogram, where each of the 0-255×0-255 cells has the same number of pixels than others; and
Generate a colorfulness score based on that diff value.

4. Face Detection

In order to detect faces in photos, algorithms such as OpenCV's face detection algorithm, or the like, may be used. Such algorithms detect faces in photos and also capture the size of each face in the photo, so one can know how dominant it is (i.e., background, foreground, primary subject of the photo, etc.).

It is noted that Google Play Services recently introduced a Faces API in the Mobile Vision library which is a significant improvement over Android's older face detection algorithm. It also includes additional data about faces such as, for example, is the person smiling? are his eyes open?, etc. In some embodiments, Google's Faces API may thus be used.

5. Detection of Objects

In a manner similar to detecting faces, in exemplary embodiments of the present invention, other types of objects may be detected in a photo, to understand its context and content. This may be done, for example, with computer vision algorithms that allow the detection of various types of objects, such as, for example:

Does the photo contain text? (e.g. a whiteboard with text or a note);
Does the photo contain a certain type of scenery? (e.g. mountains, oceans); or
Does the photo contain animations or computer generated graphics?

B. User Profiling & Preferences Module

User Profiling & Preferences Module 625 is tasked with analyzing user related data and using the data, and any analysis results as another source of input when analyzing and classifying user photos. As part of this module the following may be analyzed and calculated:

1. Find the User's Home Location/Area

GPS info in the user's photos may be analyzed and used to estimate the home area of the user. This allows an exemplary system to know if a specific photo was taken within proximity of the user's home, or, on the contrary, was taken during a trip or outing far from home.

Taking a user's photos from his Camera folders only, they can be clustered into different groups based on their GPS information. For each photo, the system can check if there already exists a cluster such that the distance to this photo is below a certain threshold (for example, a few kilometers, but this is configurable). If not—a new cluster may be created.

After this processing has been completed, the cluster with the most photos is chosen as the "home area cluster". This is based on the idea that people tend to take most of their photos in the area nearby their home.

It is noted that the home location found is not necessarily the exact home—it is a home area, based on the threshold used, which is sufficient for purposes such as deciding whether or not a photo is taken at home" or "away from home" such as on a trip.

It is noted that for frequent travelers, travel bloggers, and the like, the assumption that users take most of their photos at or near home may not apply. To detect such outliers, various tests may be used based on data such as is obtained and processed by the 3$^{rd}$ parties Module 633, as described below, and the clustering adapted or modified as appropriate.

2. Find the User's Work Location/Area

Finding the locations of the user's work area allows a system to know if a specific photo was taken at or near the user's work location. The algorithm to find a user's work area can be similar to the one used to look for the user's home area, with a few exceptions:

Only look at photos taken during work days and work hours; and

Choose the work area based on the cluster that has photos taken from most days (so looking at total unique days of photos in the cluster vs. the total number of photos looked at when searching for home).

3. Categorize the User in Terms of Photo-Taking Frequency into One of Predefined Buckets This can be calculated by dividing the total number of photos the user has by the duration in days from oldest photo to newest photo, thus getting a value for average number of photos taken per day. Based on that figure, the user may be categorized into one of three predefined photo frequency buckets: "takes many photos", "takes average photos", and "takes few photos". This value may be calculated differently for each folder on the user's device, to emphasize the difference between photos stored in the "Camera" folder to photos stored, for example, in a "WhatsApp" folder.

This kind of categorization can also apply to specific sets of photos, so as to estimate the user's photo-taking habits on specific occasions. For example: how many photos does he or she usually take when they are on a trip? How many photos does he or she usually take during the weekend?, At specific life-cycle events?, etc.

4. Analyze User Preferences

Based on the user's photographic history and his or her further actions in the system (i.e., his choices of whether to keep or delete certain photos) certain user preferences can be deduced, and can then be used to adapt and personalize photo classification for that particular user.

Thus, in exemplary embodiments of the present invention, the following user preferences may be analyzed:

Does the user like or dislike screenshots?

Does the user prefer landscape photos or portrait photos?

What are the user's favorite places and least favorite places?

Does the user prefer photos with large or small faces?

Does the user like night shots or not?

Does the user like photos taken at work or not?

Does the user like panaromas or "art" photos?

C. User Interactions with Photos

Figure 6B:
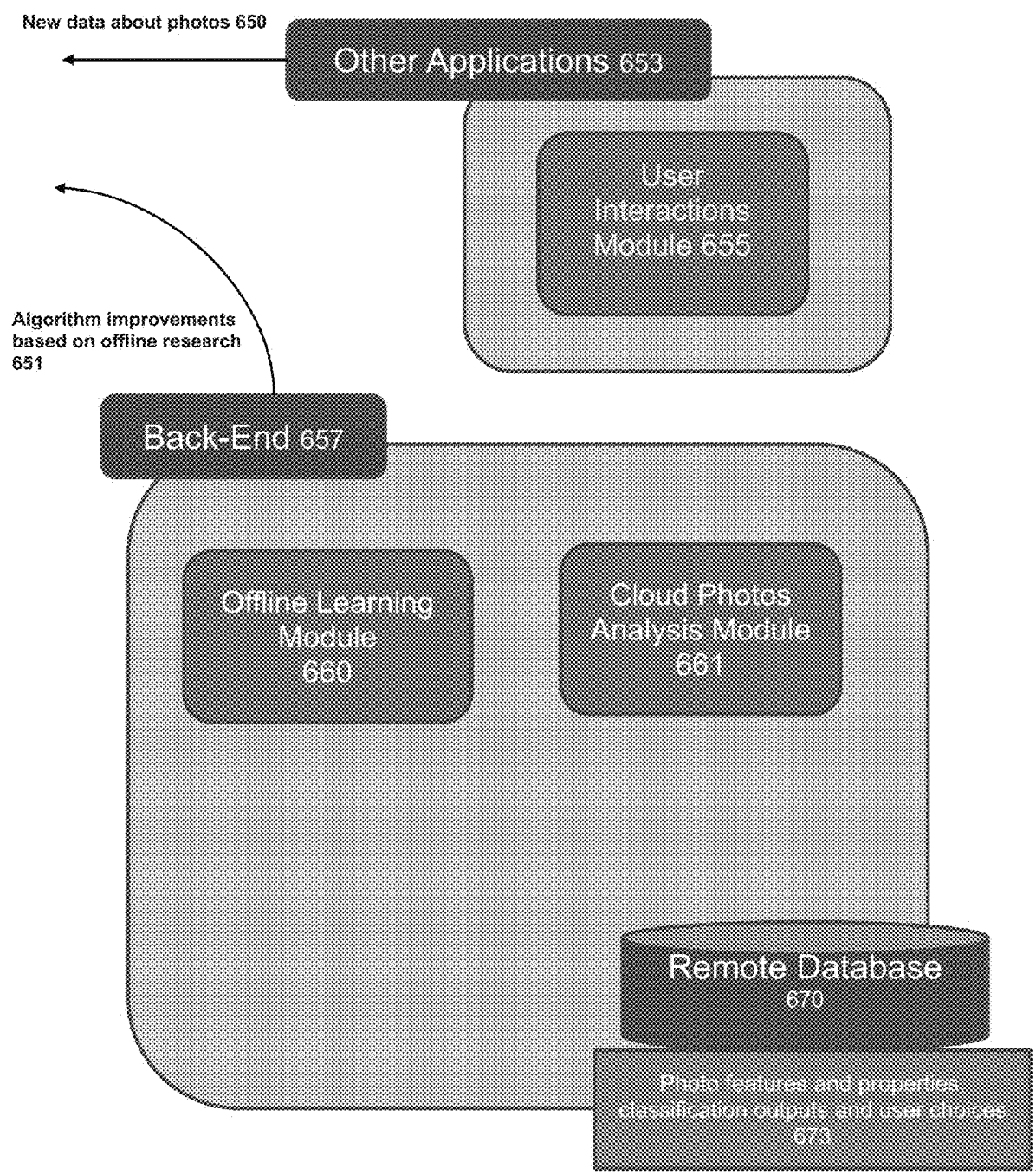

FIG. 6B illustrates User Interactions Module 655 under the "Other Applications". This module is tasked with determining the extent of the user's interaction with each photo. Each interaction type may be stored, and can later be used to assess a photo's significance and its classification. This data may be received from other user applications (shown as Other Applications 653 in FIG. 6B, which sends new data about photos" 650 to processing modules on User's Device 610) that allow a user to user interact with his or her photos, such as, for example, MyRoll Photo Gallery (https://play.google.com/store/apps/details?id=com.flayvr.flayvr).

Exemplary interaction types can include:

The number of times the user has viewed each photo;

The extent of time the user has watched each photo;

The number of times the user has shared or posted the photo;

Whether a user has deleted the photo;

Whether a user has modified, commented on, or supplied a caption for the photo; and Selection of a photo as favorite.

D. 3$^{rd}$ Parties Module

Returning FIG. 6A, 3$^{rd}$ Parties Module 633 is tasked with connecting to different social networks, or external tools and applications that the user is using, and extracting information that can be related directly or indirectly to the user's photos. Such information can include, for example:

Does the user have an event in his calendar at the time the photo was taken?

Does the user have an event in a social network at the time the photo was taken? (e.g., on Facebook)

Was the photo shared on a social platform? (e.g. Facebook Whats App, Snapchat, Dropbox, etc.)

How many likes did the shared photo receive?

E. Scoring Module

Continuing with reference to FIG. 6A, Scoring Module 630 is tasked with giving a score to each photo based on all of the calculations and analyses performed in the various modules described herein. In exemplary embodiments of the present invention, an overall score may be calculated in the following manner:

$$\text{Score}=(\text{blurrinessScore}>0.02?0.1:0)+0.2*\text{blurrinessScore}+0.2*\text{darknessScore}+(\text{colorfulnessScore}>0.2?0.1:0)+0.3*\text{colorfulnessScore}+0.1*\text{facesCount}$$

As can be seen, this exemplary score is a weighted combination of four component scores: blurrinessScore, darknessScore, colorfulnessScore and facesCount. The components and weighting can obviously be adjusted in various alternate embodiments, and other components may be added.

As described below, the exemplary photographs presented in FIG. 7-12 were scored using this example scoring algorithm, and the results for (i) Overall Score, (ii) blurrinessScore, (iii) darknessScore, (iv) colorfulnessScore, and (vi) facesCount are presented for each.

F. Classification Module

Classification Module 635 is in charge of classifying the photos into different buckets based on the calculation and analysis done in the previous modules. Thus, as a result of the processing of the Classification Module, some photos are classified in the "Bad Photos" bucket. As noted, bad photos are photos the system thinks are too bad to keep and thus recommends the user to delete them.

In exemplary embodiments of the present invention, a photo may be classified as a bad photo if any of a set of predefined rules apply to it. These rules may include:

(i) Its blurriness score is in the bin or segment of 5% lowest blurriness scores of the user's photos (i.e., if all photos are ranked based on their blurriness from lowest to highest, the photo is in the lowest 5%);

(ii) Its darkness score is below 0.1; and (iii) Its overall score is in the bin or segment of 5% lowest overall scores for the user's photos;

As noted above, other photos may be classified as "Photos for Review." Photos for review are photos that the system estimates are bad but for which the accuracy of that estimate is below a predetermined value. Thus, the system presents these photos to the user one by one so the user can decide whether to keep or delete them.

A photo may be classified as a Photo For Review if it was not previously classified as bad, and any of a set of pre-defined rules apply to it. These rules can include, for example:
 (i) Its overall score is in the 15% lowest overall scores bin of the user's photos;
 (ii) The photo is a screenshot;
 (iii) The folder the photo is in is in one of the folders marked as "boring" folders by the system, and the overall score is not in the 40% highest bin of the overall scores of the user's photos;
 (iv) The photo is inside a temporary folder; and
 (v) The photo was taken in a work location for the user, and the overall score is not in the 40% highest bin of the overall scores of the user's photos.

G. Online Learning Module/Offline Learning Module

Online Learning Module 645 in FIG. 6A is tasked with learning from a user's past actions and decisions in order to make better predictions for that user in the future. As users take actions and make decisions to keep or delete photos (647), the system can learn how they treat the photos the system had classified as bad when shown—i.e., the system can identify whether the user decided to keep the photo or delete it (647). This learning applies both in general, i.e., analyzing the preferences of many users and deducing user preferences in general. and also specifically, i.e., analyzing the preferences of a particular user and deducing, inferring or learning that user's specific preferences.

In other words, as users label photos as keep vs. delete, the system can compare that actual user decision to the system's predicted user decision, and thereby train its predictive algorithms to be more accurate. This may be done, for example, by taking all of the labeled datasets (i.e., photos with a user "keep" vs. "delete" tag) and use Machine Learning algorithms, or other heuristics, to improve the outputs of the Classification Module 635. This can be done in a variety ways:
 (i) Use global labeled data from many users to improve the overall classification for all users based on manual analysis of the labeled dataset (such as, for example, researching photo features, the predictions made and the actual users choices);
 (ii) Run machine learning algorithms for the labeled data of a specific photo, thus personalizing the classification results to a giver. For example, using logistic regres-sion, fueled with the different photo features calculated in one of the system's modules (e.g., computer vision module, or user profiling module) or any combination of those, and receive coefficients for each feature and the precision and recall scores;
 (iii) On a per user basis, change basic rules based on the user's actions. This can be done on the device itself, and can be used to personalize the classification of a given photo for that user without looking at the aggre-gate data from all users. This can, for instance, allow a given system to stop using specific classification rules for a specific user (because he or she tends to keep photos that are classified based on that rule), or to adapt the thresholds used by the system based on the user's decisions (e.g., change the percentile used to classify bad photos based on blurriness score from lowest 5% to lowest 2.5% of photos).

In exemplary embodiments of the present invention, such a learning module may run in two modes, both of which are depicted in FIGS. 6A and 6B:
 Online mode—Online Learning Module 645 (FIG. 6A)—decisions are tracked and stored on the user's device, and used in real time to change the behavior of the classification. For example—there can be classification rule that classifies all of a user's screenshots as For Review." If the system notices that the user is choosing to keep screenshots, via looking at user actions 647, it can stop labeling screenshots as "For Review" and decide that they should be kept; and
 Offline mode—Offline Learning Module 660 (FIG. 6B)—data about user decisions can be stored in a remote database 670, creating a labeled dataset. This dataset can be researched by both machine learning methods and manual analysis to analyze the differences between the system's predictions and the user's actions and improve the prediction.

Thus, FIG. 6A depicts an Online Learning Module 645 and Local Database 640, and FIG. 6B, in Back-End Module 657, includes Offline Learning Module 660 and Remote Database 670. Back-End Module 657 also includes Cloud Photos Analysis Module 661. This module can analyze cloud photos of all users in the same fashion as is done by User's Device 610, but in the cloud, such as on a system server provided by the app or system that accesses a user's cloud storage applications, and may create local copies in the cloud on system servers to proceed with in-depth, off device processing.

As can be seen in FIG. 6B, Back-End processing ulti-mately outputs algorithm improvements based on offline research 651 to the application resident on User's Device 610. These algorithmic tweaks and improvements result from both user specific and all user general analyses, as described above. The study of the totality of users allows the Back-End 657 to continually improve the algorithms used in the modules on any single user device, as well as to learn counterintuitive segmentations, rules, and associations that users may have to certain photos, which cut against tagging them for deletion.

H. Similar Photos Module

Again with reference to FIG. 6A, Similar Photos Module 623 is tasked with identifying sets of similar photos, choos-ing the best photo out of each set of identified similar photos, and allow users to review these sets of similar photos and make deletions. Thus, in exemplary embodiments of the present invention, an exemplary algorithm can go over all of a user's photos, sorted by the time they were taken, and compare pairs of consecutive photos in the following man-ner:
 (i) if the time difference between the two photos is more than 20 seconds, then they are not similar;
 (ii) otherwise (i.e., the time difference between them is less than 20 seconds), the color histograms of the two photos may be compared. This may be done using OpenCV, for example. As a result, a similarity score between the two histograms is generated using com-parison via correlation. If (i) the score is above 0.95, or
 (ii) if the score is above 0.85, but the time difference is below 10 seconds—processing moves on to additional checks. Otherwise the photos are not similar.
 (iii) additional checks: each photo is split into 4 parts: top left, top right, bottom left, and bottom right, where each part contains exactly one quarter of the pixels of the original photo. For each of the four parts, color histo-grams are run, i.e., four histograms for each photo. If the similarity score for each part or quadrant is above 0.8 the photos are marked as similar.

Variations in Values and Algorithmic Steps

As noted above, the various modules shown in FIGS. 6A and 6B are illustrative and exemplary, as are the steps and threshold values in the various algorithms described above, which may be implemented in each exemplary module. In various exemplary embodiments of the present invention, functions described as being performed in one module may be performed in others, modules may be combined or divided, and variants of both functions and modules implemented, all being within the scope of the present invention.

Exemplary Photos and Their Scores

To illustrate the above-described functionality, the overall and component scores for each photograph in FIGS. 7-12 are next presented. Scores run from 0.0 to 1.0, except for facesCount, which returns an integer.

Figure 7:
FIGS. 7-12 are exemplary photographs which were scored using exemplary processes according to an exemplary embodiment of the present invention.

FIG. 7—Castle with Trees:
score 0.217217415192263
blurrinessScore 0.10048351121626667
darknessScore 0.3785311105276976
colorfulnessScore 0.07138163614490041
facesCount 0

This is a very dark photo, as can be seen, the trees are really almost one dark hue, nearly indistinguishable from the building, and the building is itself difficult to see. As a result, the colorfulness is low. Thus, there is a low darknessScore, and an even lower colorfulnessScore. The photograph is blurred in the darker foreground but the edges are more distinct between the foreground and the blue sky. No faces are present. This photo has a low overall score, primarily due to the poor darknessScore and the terrible colorfulnessScore, and would be categorized as a "bad photo."

Figure 8:

FIG. 8—Dell Mouse:
score 0.3377899572610429
blurrinessScore 0.043597962201346874
darknessScore 0.9993947347005209
colorfulnessScore 0.09730472626889768
facesCount 0

This is a close-up of a mouse. It is very bright and mostly clear, but not a lot of color variation. Thus, a high darknessScore (=very bright) is assigned, with a very low colorfulnessScore. The photograph has some muddled edges. No faces are present. This has a higher score than FIG. 7, and likely would be classed as "boring."

Figure 9:

FIG. 9—Two People Working on a Jigsaw Puzzle:
score 0.43805594699618267
blurrinessScore 0.08152203022307909
darknessScore 0.4723549488054608
colorfulnessScore 0.424268503968249
facesCount 0

This photo has a higher score than each of FIGS. 7 and 8. Two people, faces not seen, are working a jigsaw puzzle. It is a bit dark in places, but is clear and has some color variation. However, most of the pieces of the puzzle are out of the shot and we see the wood of the table more than the puzzle pieces. The photograph is somewhat blurry, though, as one can see many puzzle pieces with fuzzy outer edges. This is exacerbated by the glare at the left side. No faces are present. This would likely would be classed as "boring."

Figure 10:

FIG. 10—AT&T Park Stadium Shot:
score 0.5160515769746578
blurrinessScore 0.35324132530038665
darknessScore 0.769565502756629
colorfulnessScore 0.30496737121084894
facesCount 0

This photo has a higher score than each of FIGS. 7-9. It is an interesting wide angle shot of AT&T Stadium with the water in the background. It is lit, and as can be seen, it was shot near sunset, with the sun low enough to reflect off of the scoreboard and make the scoreboard almost monochromatic. It does have color variation in the foreground, but the darkness of the outer portions of the foreground due, to being shot near dusk, reduces this. The photograph is a bit blurry, as the faces and clothes of the people are muddled, but edges of the landscape aspects are distinct. No faces are discernible. This may be a "for review" photo.

Figure 11:
Figure 12:
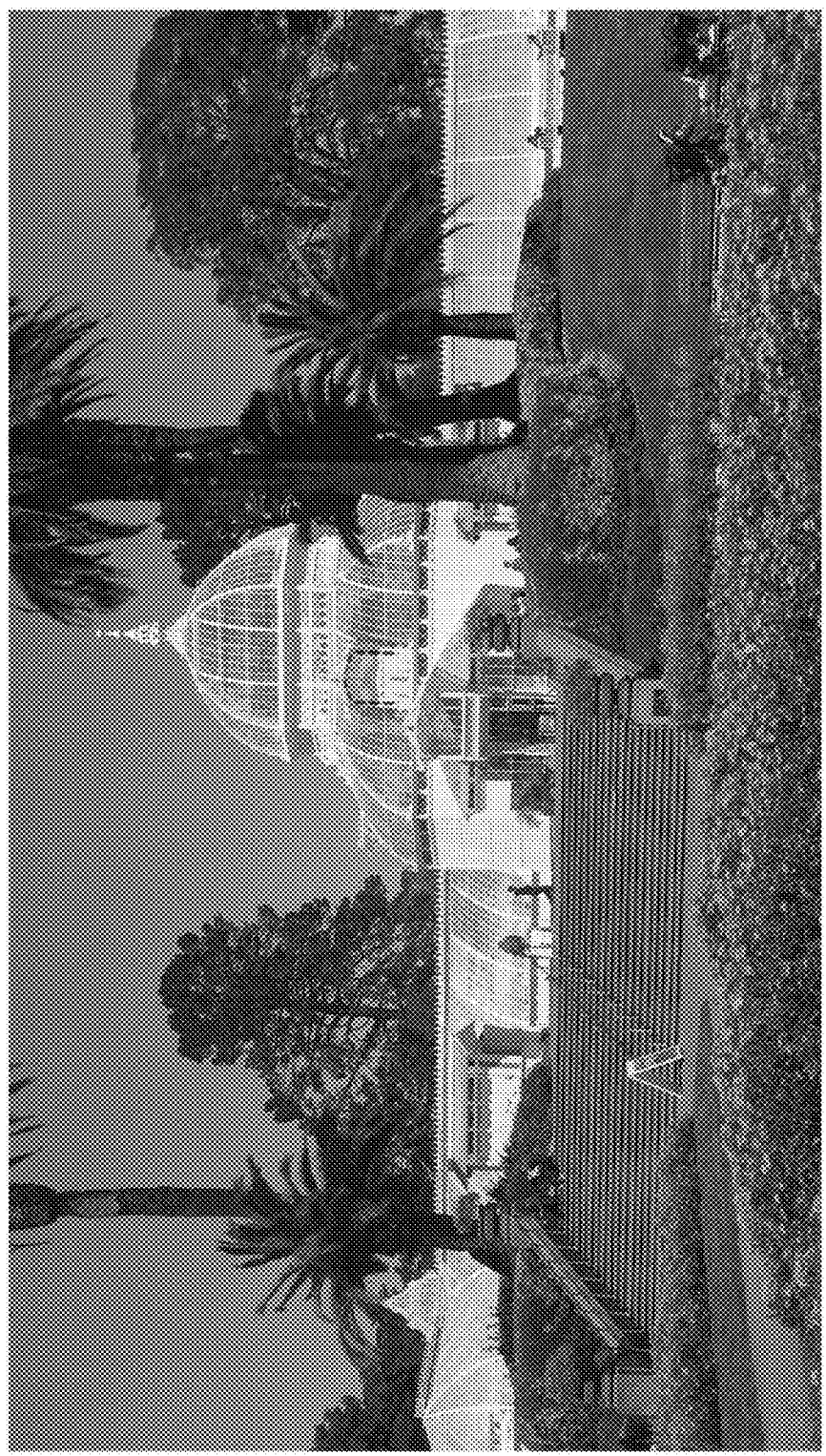

FIGS. 11 and 12, next described, are good photos, ones that a user would want to keep.

FIG. 11—Close-Up of Flower:
score 0.6000819341400705
blurrinessScore 0.0582726943276580 05
darknessScore 0.9480900498818587
colorfulnessScore 0.6626979509938904
facesCount 0

This photo has a higher score than each of FIGS. 7-10. It is a closeup of a flower, with lots of red and white hues. It is clear, and bright, and has a pleasant green background, all making for a very high darknessScore, and a high colorfulnessScore. It has some blurriness in the center, which makes the magenta spots in the center fuzzy and the edges of the red lines and spots in the petals are not markedly distinct. No people are in the photo, so no facesCount. This is a good photo, and would not be recommended to delete or even to review.

FIG. 12—Greenhouse in Park:
score 0.734618162046268
blurrinessScore 0.8211845027834304
darknessScore 0.868095300603833
colorfulnessScore 0.6558740045627176
facesCount 0

This photo has the highest score of all. It is a shot of a greenhouse structure in a park, with flowers and greenery in the foreground and trees and sky in the background. The building is white, and there is a lot of light, so a high darkness score (=light) was assigned. It is clear to see, and due to the contrasts between blue sky in the background, the white structure, and flowers in the foreground, it has a high colorfulness score, even a bit higher than that of FIG. 11. It is not blurry at all (edges re distinct throughout), and thus has the best blurriness score of all the photos (0.82, higher value is better). No people are in the photo, so facesCount is 0. This is a good photo, would definitely keep.

Although the invention has been described in detail, nevertheless changes and modifications, which do not depart from the teachings of the present invention, will be evident to those skilled in the art. Such changes and modifications are deemed to come within the purview of the present invention and the appended claims.

What is claimed:

1. A system for identifying unwanted photos on a user device associated with a user, comprising:
   at least one processor;
   a display; and
   memory, the memory containing instructions that, when executed, cause the at least one processor to:
   identify a plurality of photos based on accessing the memory of the user device;
   assign to each photo of the plurality of photos a respective image quality score based on analyzing an image quality of each photo, wherein the image quality is determined by at least one of blurriness, lighting, diversity of image colors, image sharpness, inclusion of image text, and a landscape or background of the photo;
assign a deletion tag to one or more photos of the plurality of photos based on:
(a) the respective image quality score, and
(b) analyzing both a history of user inputs of keeping or deleting photos on the user device by the user and preferences of many users; and
display, to the user, a recommendation to delete one or more of the tagged photos of the plurality of photos;
wherein one of the photos of the plurality of photos is assigned a deletion tag if the corresponding image quality score ranks in the bottom 5% of corresponding image quality scores for the plurality of photos.

2. A method of identifying unwanted photos on a user device associated with a user, comprising:
identifying a plurality of photos based on accessing the user device;
assigning a respective image quality score to each photo of the plurality of photos based on determining a quality of each photo, wherein the image quality is determined by at least one of image blurriness, lighting, diversity of image colors, image sharpness, inclusion of image text, and a landscape or background of the photo;
assigning a deletion tag to one or more photos of the plurality of photos based on:
(a) a respective image quality score, and
(b) analyzing both a history of user inputs of keeping or deleting photos on the user device by the user and preferences of many users; and
displaying, to the user, a recommendation to delete one or more of the tagged photos of the plurality of photos;
wherein one of the photos of the plurality of photos is assigned a deletion tag if the corresponding image quality score ranks in the bottom 5% of corresponding image quality scores for the plurality of photos.

3. The system of claim 1, wherein:
the user device displays a thumbnail of each tagged photo, and wherein one or more of the displayed photos are deleted based on a user's election.

4. The system of claim 1, the instructions further causing the processor to:
determine an extent of interaction of the user with each photo of the plurality of photos; and
assign to each photo a user interaction score based on the extent of interaction,
wherein assigning the deletion tag to the one or more photos is based at least in part on the user interaction score.

5. The system of claim 1, the instructions further causing the at least one processor to:
assign to each photo, of the plurality of photos, a respective image properties score,
wherein the respective image properties score of each photo is based on determining at least one of:
the photo is stored in a folder on the user device, an identity of people in the photo, length of a video comprising the photo, a place of interest associated with the photo, the photo was taken using the device's camera, the photo is a screenshot, a number of photos taken during a window of time close to the photo's time and date, and the photo was taken at a special event.

6. The system of claim 1, the instructions further causing the at least one processor to:
assign to each photo a user profile score, wherein the assigning the deletion tag to the photos is based, at least in part, on the user profile score, and wherein the user profile score is based on determining at least one of:
where the user lives, where the user works, photographic habits of the user, user preferences regarding style of photos, number of photos the user usually takes in a defined time period or portion of the week or month, number of photos the user usually takes when away from home or on a trip, whether the user likes or dislikes screenshots, whether the user prefers landscape photos or portrait photos, whether a photo was taken at a favorite location of the user, and whether the photo taken with favorite people of the user.

7. The system of claim 1, wherein the instructions causing the at least one processor to analyze the history of the user inputs of keeping or deleting the photos is further based on:
storing the user inputs indicative of whether to keep or delete the photos; and
analyzing the user inputs to predict user actions associated with keeping or deleting a recently stored photo.

8. The system of claim 1, the instructions further causing the at least one processor to:
assign a user review tag to some photos of the one or more tagged photos based, at least in part, on the corresponding image quality score, and
cause display of a summary of the tagged photos assigned the user review tag to the user.

9. The system of claim 1, wherein:
some of the one or more photos assigned a deletion tag are similar to, or duplicates of, a remainder of the plurality of photos, and the instructions further causing the at least one processor to display all photos similar to, or duplicates of, each other in a set, and marking one of the set as a "best photo", wherein a user can delete any or all of the similar or duplicate photos in a set, including the photo tagged as "best photo".

10. The system of claim 1, the instructions further causing the at least one processor to:
identify videos of an extended length based on predefined criteria;
assign a deletion tag to the identified overly long videos; and
display to the user a recommendation to delete the tagged videos of the extended length.

11. The system of claim 1, wherein:
the image quality score is a sum of weighted component scores, the components including a blurriness score, a darkness score, a colorfulness score and a number of visible faces score, wherein the blurriness score measures the exactness of edges in the photo, and the colorfulness score measures the diversity of hues in the photo.

12. The system of claim 1, wherein a photo is tagged for deletion if:
it is one of the 5% most blurry photos on the user device.

13. The system of claim 1, wherein one of the photos of the plurality of photos is assigned a deletion tag if the image quality associated with darkness satisfies a predetermined threshold.

14. The system of claim 1, the instructions further causing the at least one processor to:
identify a screenshot image associated with one of the plurality of photos; and
display, to the user, the identified screenshot image for user review based on a set of predefined rules, wherein the user review is indicative of whether to keep or delete the identified screenshot image.

15. The system of claim 1, wherein:
the image quality of each photo is further determined based on at least one of:
whether the photo contains faces, if the photo contains faces determining a respective size of faces in the photo, and whether the photo contains specific objects.

16. The system of claim 1, the instructions further causing the at least one processor to:
assign to each photo of the plurality of photos a third party score, wherein the assigning the deletion tag to the one or more photos is based, at least in part, on the third party score, wherein the third party score is based on:
information extracted from social networks including a number of network shares, a number of likes received, a number of comments received, and associated user calendar entries.

17. The method of claim 2, wherein the determining the image quality of each photo of the plurality of photos is further based on at least one of:
whether the photo contains faces, if the photo contains faces determining a respective size of faces in the photo, and whether the photo contains specific objects.

18. The method of claim 2, further comprising:
determining an extent of interaction of the user with each photo of the plurality of photos; and
assigning each photo an interaction score based on the extent of interaction,
wherein the assigning the deletion tag to the one or more photos is based, at least in part, on the interaction score.

19. The method of claim 2, further comprising:
determining image properties respectively corresponding to each photo of the plurality of photos; and
assigning to each photo an image properties score based on the corresponding image properties, wherein the assigning the deletion tag is based, at least in part, on the image properties score, and wherein the image properties of each photo is determined based on at least one of:
whether the photo is stored in a folder on the user device, identification of people in the photo, length of a video comprising the photo, a place of interest associated with the photo, whether the photo was taken using the device's camera, whether the photo is a screenshot, number of photos taken during a window of time close to the photo's time and date, and whether the photo was taken at a special event.

20. The method of claim 2, further comprising:
assigning to each photo a user profile score, wherein the assigning the deletion tag is based, at least in part, on the user profile score, wherein the user profile score is based on determining at least one of:
where the user lives, where the user works, photographic habits of the user, user preferences regarding style of photos, number of photos the user usually takes in a defined time period or portion of the week or month, number of photos the user usually takes when away from home or on a trip, whether the user likes or dislikes screenshots, whether the user prefers landscape photos or portrait photos, whether a photo was taken at a favorite location of the user, and whether the photo was taken with favorite people of the user.

21. The method of claim 2, further comprising:
assigning each photo of the plurality of photos with a third party score, wherein the assigning the deletion tag to the one or more photos is based, at least in part, on the third party score, wherein the third party score is based upon:
information extracted from social networks including a number of network shares, a number of likes received, a number of comments received, and associated user calendar entries.

22. The method of claim 2, further comprising:
storing the user inputs associated with keeping or deleting the one or more tagged photos; and
analyzing the stored user inputs to predict a user preference for keeping or deleting a next photo, wherein the analyzing includes comparing the user inputs with the recommendations associated with the same photos, and modifying a personalized user scoring on which the recommendation to delete one or more of the tagged photos are based.

23. The system of claim 4, wherein the extent of the interaction of the user with each photo is determined by at least one of:
a number of times the user has viewed each photo, an extent of time the user has viewed each photo, a number of times the user has sent or posted the photo, and selection of a photo as a favorite by the user.

24. The system of claim 7, wherein the analysis of the user inputs indicative of whether to keep or delete the photos includes:
comparing the user inputs with displayed recommendations to delete the same photos; and
modifying user specific preferences on which the recommendations to delete user photos are based, wherein the user specific preferences are based on the history of the user inputs.

25. The system of claim 7, wherein the analysis of the user inputs indicative of whether to keep or delete the photos includes:
using global data from a plurality of users, wherein the global data is associated with respective user choices corresponding to keeping or deleting respective user photos and respective user preferences associated with the plurality of users.

26. The method of claim 18, wherein the extent of the interaction of the user with each photo is determined by at least one of:
a number of times the user has viewed each photo, an extent of time the user has viewed each photo, a number of times the user has sent or posted the photo, whether a user has deleted the photo, and selection of a photo as favorite by the user.

* * * * *